United States Patent [19]

Harrell et al.

[11] 4,374,150

[45] Feb. 15, 1983

[54] UREA YEAST FOOD FOR BAKING

[75] Inventors: Richard G. Harrell, Garland; Herman L. Glover, Carrollton; Gary L. Cain, Dallas, all of Tex.

[73] Assignee: Cain Food Industries, Inc., Dallas, Tex.

[21] Appl. No.: 161,884

[22] Filed: Jun. 23, 1980

[51] Int. Cl.³ .......................... A21D 2/24; C12N 1/16
[52] U.S. Cl. ........................................ 426/19; 426/62; 435/255; 435/256
[58] Field of Search ....................... 426/19, 60, 62, 18; 435/255, 256

[56] References Cited

U.S. PATENT DOCUMENTS 4,093,749 6/1978 Sternberg ............................... 426/19

FOREIGN PATENT DOCUMENTS 337930 11/1930 United Kingdom .
1178514 1/1970 United Kingdom .
1457123 12/1976 United Kingdom .
1527029 10/1978 United Kingdom .
1535844 12/1978 United Kingdom .
1545320 5/1979 United Kingdom .
2030843 4/1980 United Kingdom .

OTHER PUBLICATIONS

Rose et al., *The Yeasts*, vol. 3, Chapter 7, "Baker's Yeast", 1970, pp. 350–354, 357–358; 372–373 and 386–387, N.Y.

Ameaine et al., *Technology of Wine*, published by The AVI Publishing Co. Inc., Westport, Conn., 1972, pp. 186, 370–371, 466, 531, 536–537 and 797.

*Primary Examiner*—Raymond N. Jones
*Assistant Examiner*—Elizabeth A. Hatcher
*Attorney, Agent, or Firm*—Richards, Harris & Medlock

[57] ABSTRACT

An improved yeast food is provided for use in yeast leavened bakery products that exhibits improved nitrogen availability for the yeast. The yeast food includes urea as the nitrogen source compound and is compatible with typical oxidizers used in yeast foods so that a bulking agent is not required in the yeast food.

7 Claims, No Drawings

UREA YEAST FOOD FOR BAKING

TECHNICAL FIELD

This invention relates to yeast bakery products generally. More particularly, this invention relates to a novel additive for yeast leavened bakery products which provides an improved method for obtaining the desired fermentation in the doughs that are used in such bakery products.

BACKGROUND ART

Historically, there have been two principal methods of making yeast leavened products in the baking industry, namely the "straight dough" method and the "sponge dough" method. Both methods require lengthy periods of fermentation to achieve the desired results in the finished products. In the straight dough method, all of the ingredients of the formula are mixed together to full development. Then the dough must be allowed to stand (ferment) at between about 80° and 86° F. for about 1½ to 3 hours. Then, after dividing into individual pieces, rounding, and another fermentation period of about 15 to about 25 minutes, commonly referred to as intermediate proof, the dough is molded to the desired shape. The dough then goes through another fermentation period generally of from about 50 to about 90 minutes at between about 100° and 105° F. at a relative humidity of between about 90% and 95%. This fermentation period is commonly known as proofing. During this time, the dough rises to the desired shape and height before going into the oven. After proofing, the dough is baked for between about 18 and 30 minutes at between about 375° and 450° F.

In the commercially more acceptable sponge dough method, from about 50% to about 70% of the flour is mixed with the yeast, yeast nutrient or food, shortening, part of the salt, and an equivalent amount of water to form a stiff dough with little development. This is referred to as the "sponge." Then the sponge is fermented over a widely varying time period, depending on production methods, the time generally ranging from between about 2½ and 5 hours at a temperature of from about 78° to 80° F. Then the sponge is remixed with the remaining 30% to 50% of the flour and other ingredients, for about 10 minutes or until full development. The dough is then allowed to "relax" for between about 15 and 30 minutes before dividing. From this point the dough is processed as in the straight dough method.

In addition to the foregoing methods, other methods have been developed in recent years to impart the desired characteristics to the finished product. One utilizes a liquid preferment brew. In lieu of a fermented sponge, a liquid brew is prepared, containing some of the dough ingredients, such as part of the yeast, the yeast nutrient, sugar and most of the water. The brew is allowed to ferment for between 30 minutes and 1½ hours at a temperature of between about 75° and 85° F., after which the brew is chilled and held at about 40° F. until needed. Then a properly measured portion of the brew is added to the remainder of the dough ingredients for each batch, and the dough is mixed to full development. After a short time (between about 1 and 20 minutes, depending upon the particular product being made), machining and proofing operations are carried out as in the straight dough method.

In all of these methods, the fermentation step accounts for up to about 90% of the time involved in a baking process. Fermentation is the step the baker relies upon most to impart to the finished product many of the qualities that are desired.

In order to insure adequate activity of yeast in the dough, and thereby achieve successful fermentation in the bread making process, the baking industry has used successfully through the years various compounds as yeast nutrients or foods. It has long been recognized that, for adequate fermentation, yeast requires more than the sugar normally included in the recipe and the sugar obtained from starch conversion by enzymatic action. Further requirements of yeast include certain mineral salts and nitrogen. A readily accessible source of nitrogen is needed for the active fermentation of sugars to carbon dioxide and alcohol or to carbon dioxide and water.

The compounds that have been used in the past to provide these nutrients in the baking industry have included inorganic salts, namely the ammonium salts of acid radicals such as ammonium sulfate, ammonium chloride, monoammonium phosphate, and diammonium phosphate.

It is common practice in the baking industry to employ as additives so-called "yeast foods" or nutrients. Technically, any substance necessary to support the growth activities of yeast might be classified as a yeast food. In a more limited sense, and as used in this disclosure, unless otherwise noted, the term "yeast food" refers to a combination of yeast nutrients and dough conditioning ingredients. In a typical yeast food of the prior art, a salt usually serves the specific function of a yeast nutrient. Generally, this is an ammonium salt, such as ammonium sulfate, ammonium chloride, or ammonium phosphate. The salt dissociates in solution to yield ammonium ions which are utilized by yeast as a source of nitrogen. The primary function of the yeast nutrient is as a nitrogen source. Although the sulfate and phosphate ions also stimulate yeast activity, dough normally contains adequate amounts of these minerals for yeast activity.

Most other compounds often included in yeast foods fall into three categories. (1) Flour protein (dough) conditioners that contain oxygen or liberate oxygen when added to a dough mass. Typically, the dough conditioners are inorganic salts. Dough conditioners include potassium bromate, calcium bromate, potassium iodate, calcium iodate, azodicarbonamide, ascorbic acid, calcium dioxide, and in some cases various enzymes. (2) Bulking agents are often required due to the reactivity of the ammonium salts with some of the oxidants. The most commonly used oxidant, potassium bromate, requires that the yeast food blend be bulked in order to keep the oxidant separate from the ammonium salt. (3) Water conditioners which consist of chemical salts for water conditioning. Due to a great improvement in the uniformity of municipal water supplies over the years, it is very seldom necessary to add the various chemical salts for water conditioning. Most of these compounds have become bulking agents or carriers for the ammonium salts and oxidizers.

DISCLOSURE OF THE INVENTION

In accordance with the present invention, an improved yeast food is provided that contains an oxidizer and urea as a nitrogen source. The urea is compatible with the oxidizer so that a bulking agent is not required in the yeast food. Suprisingly, the yeast food of the invention exhibits improved availability of nitrogen for the yeast. It also reduces the proofing time for yeast leavened bakery products. The improved yeast food in accordance with the invention includes an effective amount of urea for providing a nitrogen source for the yeast.

In accordance with another aspect of the present invention, an improved method of baking leavened products is provided utilizing the improved nitrogen source of the present invention. The method reduces the proofing time required for yeast leavened bakery products by providing an effective amount of urea as a nitrogen source for the yeast. The improved process for baking yeast leavened bakery products in accordance with the invention comprises the addition of an effective amount of urea to the dough prior to fermentation of the dough.

DETAILED DESCRIPTION

In accordance with one embodiment of the present invention, there is provided a method of baking yeast leavened bakery products that includes the addition of an effective amount of urea to the dough prior to fermentation of the dough. In accordance with this embodiment of the present invention, the urea may be incorporated in the dough by any suitable manner. The method of urea incorporation into the dough is not a limitation on the present invention. For example, the urea may be present in a yeast food that is added to the baking composition prior to fermentation. Alternate methods of incorporation are given by way of example only, and are not limitations upon the present invention. These methods include incorporation of the urea in preblended bakery premixes, and adding urea directly to the flour at the flour mill.

Generally, the amount of urea incorporated into the dough prior to fermentation will range from about 5 parts to about 400 parts per million of flour on a weight basis. For one type of dough that the inventors have utilized, having the following formulation, flour—100.0 parts, water—62.0 parts, sugar—8.0 parts, yeast—4.0 parts, shortening—3.0 parts, emulsifier—0.5 parts, non-fat dry milk—2.0 parts, salt—2.0 parts, the preferred concentration of urea was between about 44 parts per million and 88 parts per million on a flour weight basis. It is anticipated that different dough formulas may require some optimization of the preferred urea concentration range or dosage.

The type of urea utilized in accordance with the present invention should be a grade that does not contain toxic or otherwise deleterious substances. One suitable grade is urea U.S.P.

In accordance with another aspect of the present invention, a yeast food is provided that contains an effective amount of urea for providing a nitrogen source that is readily assimilable by the yeast. The nitrogen present in urea is more available to yeast than prior art nitrogen sources, such as ammonium sulfate, thereby allowing use of a lower dosage of total nitrogen. Thus, in accordance with the present invention, a yeast food is provided that includes an effective amount of urea and an effective amount of an oxidizer, such as potassium bromate, for example. In general, any oxidizer suitable for use in yeast leavened baking can be incorporated in the yeast food of the present invention, as long as it is compatible with urea. For example, other oxidizers which may be used in the yeast food and the method of the present invention include calcium bromate, potassium iodate, calcium iodate, azodicarbonamide, ascorbic acid, and calcium dioxide. Further, if it were desired to utilize a urea-containing yeast food with an oxidizer that would have a deleterious effect upon the urea, it would be possible to employ a bulking agent, such as is commonly used with yeast foods containing ammonium salts and oxidants such as potassium bromate. However, in accordance with the preferred embodiment of the present invention, the yeast food containing urea and an oxidant will have an oxidant which is compatible with the urea so that a bulking agent is not required.

The yeast foods of the present invention may be packaged in any form that is desired. For example, the yeast food may be in tablet form, or contained in a soluble starch film pouch. The pouch or tablet could be prescaled to contain predetermined weights of urea and the oxidizer in preferred ratios for treating a specified weight of flour. Another component which may be present in the yeast food of the present invention is a calcium salt. The bivalent calcium ion has a beneficial effect on the colloidal structure of the wheat gluten. Suitable calcium salts include, for example, calcium sulfate, calcium peroxide, calcium carbonate, dicalcium phosphate and monocalcium phosphate.

The following examples are given to better facilitate understanding of this invention and are not intended to limit the scope thereof. Parts are by weight unless designated otherwise. Dosages set forth in these Examples as ppm (parts per million) are on the basis of bakers parts per million. Bakers parts per million are based on amount of component per 100 pounds of flour. To calculate a given part per million amount in grams the following procedure is used. Let x equal the desired part per million per 100 pounds of flour. Then, (x parts/one million parts)×(45,400 grams/100 pounds flour)=grams component/100 pounds flour. For example, if 20 parts per million of a desired component is needed, then (20 parts/one million parts)×(45,400 grams/100 pounds flour)=0.908 grams/100 pounds flour. This would be equivalent to saying "20 parts per million per 100 pounds flour." It will be readily apparent to one skilled in the art that equivalent materials and alternate steps designated to achieve similar ends can be readily used without departing from the scope of this invention.

EXAMPLE 1

The performance of various yeast foods was evaluated by measuring production of $CO_2$ gas which is a by-product of yeast metabolism. $CO_2$ production was measured by displacement of water caused by the increased pressure in a vessel containing the dough. In each case, the dough utilized had the following formula:

| Ingredient | Parts by Weight |
| --- | --- |
| Flour | 100.0 |
| Water | 62.0 |
| Sugar | 8.0 |
| Yeast | 4.0 |
| Shortening | 3.0 |
| Emulsifiers | 0.5 |
| Nonfat dry milk | 2.0 |
| Salt | 2.0 |
| Yeast food | as indicated |

Three types of yeast foods were evaluated: urea, ammonium sulfate and a commercial yeast food preparation commonly known as an acid type yeast food. The composition of the acid type yeast food was as follows:

| Ingredient | Parts by Weight |
| --- | --- |
| Monocalcium phosphate | 50.0 |
| Ammonium sulfate | 7.0 |
| Salt | 20.0 |
| Potassium iodate | .10 |
| Potassium bromate | .15 |
| Flour | 22.75 |

Unless otherwise indicated the yeast food dosages are based on 100 pounds of flour in a dough having the formula as previously set forth in this example.

The dosages utilized for ammonium sulfate and the acid type yeast food were those doses that have become standard in the baking industry.

TABLE 1

Measurement of $CO_2$ Production by Displacement of Water-Comparison of Urea vs. Ammonium Sulfate vs. Commercial Yeast Food Preparation (Acid type yeast food).
A. Yeast Food and Dosage: Acid type yeast food, 8 oz/cwt. flour

| Time (min.) | $CO_2$ Production Buret Reading (ml $H_2O$) | Time (min.) | $CO_2$ Production Buret Reading (ml $H_2O$) |
| --- | --- | --- | --- |
| 10.0 | — | 65.0 | 71.7 |
| 20.0 | — | 70.0 | 82.6 |
| 30.0 | 5.0 | 75.0 | 93.2 |
| 35.0 | 13.0 | 80.0 | 104.1 |
| 40.0 | 21.7 | 85.0 | 115.1 |
| 45.0 | 31.2 | 90.0 | 126.3 |
| 50.0 | 40.7 | 95.0 | 137.5 |
| 55.0 | 50.8 | 100.0 | 148.7 |
| 60.0 | 61.5 | 105.0 | 160.4 |

TABLE 2

B. Yeast Food and Dosage: Ammonium Sulfate, 22 g/cwt. flour

| Time (min.) | $CO_2$ Production Buret Reading (ml $H_2O$) | Time (min.) | $CO_2$ Production Buret Reading (ml $H_2O$) |
| --- | --- | --- | --- |
| 10.0 | — | 40.0 | 47.4 |
| 15.0 | — | 45.0 | 63.0 |
| 20.0 | .3 | 50.0 | 76.9 |
| 25.0 | 11.0 | 55.0 | 91.2 |
| 30.0 | 22.9 | 60.0 | 105.5 |
| 35.0 | 33.8 | 65.0 | 120.2 |

TABLE 3

C. Yeast Food and Dosage: Urea, 7.5 g/cwt. flour

| Time (min.) | $CO_2$ Production Buret Reading (ml $H_2O$) | Time (min.) | $CO_2$ Production Buret Reading (ml $H_2O$) |
| --- | --- | --- | --- |
| 10.0 | — | 60.0 | 106.9 |
| 20.5 | 0.1 | 65.0 | 122.5 |
| 25.0 | 9.6 | 70.0 | 138.1 |
| 30.0 | 22.5 | 75.0 | 154.4 |
| 35.0 | 35.7 | 80.0 | 170.6 |
| 40.0 | 49.4 | 85.0 | 187.0 |
| 45.0 | 63.9 | 90.0 | 203.6 |
| 50.0 | 77.5 | 95.0 | 220.0 |
| 55.0 | 92.0 | 100.0 | 235.9 |

From the foregoing results, urea provided better results than either ammonium sulfate or the commercial acid type yeast food.

EXAMPLE 2

Utilizing the dough composition as set forth in Example 1, $CO_2$ production data from dough comparing two yeast foods, urea and ammonium sulfate, was obtained at various dosage levels of yeast food. In addition, a control was utilized in which no yeast food was incorporated. The following results were obtained:

| Time (min.) | $CO_2$ Production Buret Reading (ml $H_2O$) | Time (min.) | $CO_2$ Production Buret Reading (ml $H_2O$) |
| --- | --- | --- | --- |
| A. Yeast Food: No Yeast Food (Control) | | | |
| 5.0 | — | 35.0 | 45.5 |
| 10.0 | — | 40.0 | 57.9 |
| 15.0 | 3.5 | 45.0 | 70.6 |
| 20.0 | 13.3 | 50.0 | 89.7 |
| 25.0 | 22.6 | 55.0 | 98.3 |
| 30.0 | 33.7 | 60.0 | 112.6 |
| B. Yeast Food and Dosage: Ammonium Sulfate, 23.0 g/cwt. flour | | | |
| 5.0 | — | 35.0 | 53.0 |
| 10.0 | — | 40.0 | 68.9 |
| 15.0 | 8.8 | 45.0 | 80.0 |
| 20.0 | 17.4 | 50.0 | 93.7 |
| 25.0 | 30.6 | 55.0 | 107.8 |
| 30.0 | 41.0 | 60.0 | 122.7 |
| C. Yeast Food and Dosage: Urea, 3.84 g/cwt. flour | | | |
| 5.0 | — | 35.0 | 63.8 |
| 10.0 | 0.1 | 40.0 | 79.7 |
| 15.0 | 10.2 | 45.0 | 99.2 |
| 20.0 | 22.5 | 50.0 | 112.6 |
| 25.0 | 34.9 | 55.0 | 130.4 |
| 30.0 | 49.1 | 60.0 | 147.2 |
| D. Yeast Food and Dosage: Urea, 5.75 g/cwt. flour | | | |
| 5.0 | — | 35.0 | 68.6 |
| 10.0 | 1.4 | 40.0 | 88.2 |
| 15.0 | 12.1 | 45.0 | 102.1 |
| 20.0 | 24.6 | 50.0 | 119.5 |
| 25.0 | 38.4 | 55.0 | 137.5 |
| 30.0 | 53.2 | 60.0 | 156.0 |
| E. Yeast Food and Dosage: Urea, 7.51 g/cwt. flour | | | |
| 5.0 | — | 35.0 | 73.3 |
| 10.0 | 5.4 | 40.0 | 89.9 |
| 15.0 | 16.2 | 45.0 | 109.4 |
| 20.0 | 29.2 | 50.0 | 124.5 |
| 25.0 | 42.4 | 55.0 | 142.6 |
| 30.0 | 57.8 | 60.0 | 160.6 |
| F. Yeast Food and Dosage: Urea, 6.70 g/cwt. flour | | | |
| 5.0 | — | 35.0 | 70.9 |
| 10.0 | 4.2 | 40.0 | 89.5 |
| 15.0 | 14.9 | 45.0 | 103.4 |
| 20.0 | 27.4 | 50.0 | 120.5 |
| 25.0 | 41.0 | 55.0 | 142.0 |
| 30.0 | 55.7 | 60.0 | 156.7 |
| G. Yeast Food and Dosage: Urea, 7.12 g/cwt. flour | | | |
| 5.0 | — | 35.0 | 70.0 |
| 10.0 | 1.2 | 40.0 | 87.7 |
| 15.0 | 12.8 | 45.0 | 104.0 |
| 20.0 | 24.4 | 50.0 | 121.6 |
| 25.0 | 37.2 | 55.0 | 139.4 |
| 30.0 | 54.2 | 60.0 | 159.7 |
| H. Yeast Food and Dosage: Urea, 8.27 g/cwt. flour | | | |
| 5.0 | — | 35.0 | 73.5 |
| 10.0 | 4.8 | 40.0 | 90.1 |
| 15.0 | 15.6 | 45.0 | 107.2 |
| 20.0 | 28.5 | 50.0 | 128.6 |
| 25.0 | 39.4 | 55.0 | 142.8 |
| 30.0 | 57.6 | 60.0 | 161.4 |
| I. Yeast Food and Dosage: Urea, 8.50 g/cwt. flour | | | |
| 5.0 | — | 35.0 | 56.1 |
| 10.0 | — | 40.0 | 70.9 |
| 15.0 | 6.2 | 45.0 | 86.3 |
| 20.0 | 16.4 | 50.0 | 102.1 |
| 25.0 | 29.8 | 55.0 | 118.1 |
| 30.0 | 41.8 | 60.0 | 135.0 |
| J. Yeast Food and Dosage: Urea, 8.93 g/cwt. flour | | | |
| 5.0 | — | 35.0 | 60.2 |
| 10.0 | 0.1 | 40.0 | 75.5 |

-continued

| Time (min.) | $CO_2$ Production Buret Reading (ml $H_2O$) | Time (min.) | $CO_2$ Production Buret Reading (ml $H_2O$) |
|---|---|---|---|
| 15.0 | 9.0 | 45.0 | 91.6 |
| 20.0 | 19.7 | 50.0 | 106.9 |
| 25.0 | 37.6 | 55.0 | 123.0 |
| 30.0 | 45.2 | 60.0 | 140.4 |
| K. Yeast Food and Dosage: Urea, 10.48 g/cwt. flour | | | |
| 5.0 | — | 35.0 | 57.5 |
| 10.0 | — | 40.0 | 72.4 |
| 15.0 | 6.4 | 45.0 | 87.7 |
| 20.0 | 19.7 | 50.0 | 103.7 |
| 25.0 | 29.9 | 55.0 | 119.6 |
| 30.0 | 44.5 | 60.0 | 135.9 |
| L. Yeast Food and Dosage: Ammonium Sulfate, 8.93 g/cwt. flour | | | |
| 5.0 | 0.1 | 35.0 | 58.1 |
| 10.0 | 0.8 | 40.0 | 71.8 |
| 15.0 | 9.4 | 45.0 | 86.0 |
| 20.0 | 21.7 | 50.0 | 104.5 |
| 25.0 | 32.8 | 55.0 | 117.5 |
| 30.0 | 44.1 | 60.0 | 133.4 |
| M. Yeast Food and Dosage: Ammonium Sulfate, 17.6 g/cwt. flour | | | |
| 5.0 | — | 35.0 | 52.4 |
| 10.0 | 0.1 | 40.0 | 65.7 |
| 15.0 | 8.2 | 45.0 | 88.3 |
| 20.0 | 16.6 | 50.0 | 94.6 |
| 25.0 | 27.7 | 55.0 | 109.4 |
| 30.0 | 41.3 | 60.0 | 126.3 |

As the results of this example indicate, optimum production of $CO_2$ was obtained at a urea concentration of between 3.84 and 8.27 grams per/cwt. flour. Relatively large decreases in $CO_2$ production occurred when the concentration of urea exceeded 8.5 gram per cwt. flour. In dosages of between 8.93 g/cwt. weight flour and 23.0 g/cwt. flour, ammonium sulfate produced approximately the same amount of $CO_2$, which, in each case was less than the amount of $CO_2$ produced by the dough when urea was utilized.

EXAMPLE 3

A bake test was conducted to determine the acceptability of urea as a replacement for presently used yeast foods. The objective of the test was to measure relative proof times and volumes of bread baked by a sponge dough process using two different yeast foods as controls. The two yeast foods utilized were an acid type yeast food of the same composition as set forth in the Example 1 and a non-acid type yeast food having the following composition:

| Ingredient | Parts by Weight |
|---|---|
| Calcium Sulfate | 78.49 |
| Potassium Bromate | 1.25 |
| Ammonium Sulfate | 20.26 |

The sponge-dough formula consisted of a first stage (70% sponge) and a dough stage, having the following formulas:

| Ingredient | Parts by Weight |
|---|---|
| First Stage | |
| Flour | 70 |
| Shortening | 3 |
| Yeast | 2 |
| Water | 41.7 |
| Dough Stage | |
| Flour | 30 |
| Salt | 2 |
| Sugar | 8 |
| Nonfat dry milk | 3 |
| Water | 20 |

The test utilized in this example included adding the dough stage to the first stage and mixing at 86° F. After mixing, the resulting mixture was allowed to ferment and relax, thereby allowing the yeast to adjust to the added sugar. The resulting mixture was then machined into the desired shapes after which the shaped dough was allowed to relax for 15 minutes. The dough was then proofed at 100° F. with the following results being obtained utilizing the various yeast foods:

| Trial No. | Yeast Food | Yeast Food Dosage | Proof Time | Specific Volume** |
|---|---|---|---|---|
| 1. | Non-acid type | * | 63 minutes | 4.87 |
| 2. | Acid type | * | 65 minutes | 4.82 |
| 3. | None | — | 58 minutes | 4.90 |
| 4. | Urea | 3.2 ppm | 57 minutes | 5.02 |
| 5. | Urea | 6.4 ppm | 48 minutes | 5.07 |
| 6. | Urea | 9.6 ppm | 50 minutes | 4.61 |
| 7. | Urea | 12.8 ppm | 50 minutes | 4.70 |
| 8. | Urea | 16.0 ppm | 50 minutes | 5.04 |

*Both dosages for the non-acid and acid type yeast foods were standard doses as used in the industry which provide about 23 gm/cwt. flour of ammonium sulfate.
**Units of specific volume are volume of the baked bread in $cm^3$ per weight of the baked bread in grams.

The results of this example indicate that at levels of urea of 3.2 ppm to 16.0 ppm, bread baked with this yeast nutrient had considerable shorter proof times averaging a decrease of about 20.3%.

EXAMPLE 4

A comparison of fermentation times between three yeast foods, non-acid type, acid type and urea in accordance with the present invention was conducted utilizing a sponge dough and method as set forth in Example 3. The following fermentation times were obtained:

| Trial No. | Yeast Food Type | Yeast Food Concentration | Fermentation Time To Mark (min.) |
|---|---|---|---|
| 1. | non-acid | * | 54 |
| 2. | Acid | * | 49 |
| 3. | Urea | 3 ppm/part flour | 62 |
| 4. | Urea | 6 ppm/part flour | 49 |
| 5. | Urea | 9 ppm/part flour | 48 |
| 6. | Urea | 12 ppm/part flour | 50 |

*Indicates dosage was normal industry dosage for this type of yeast food, as set forth in Example 3.

The above results indicate that the yeast food in accordance with the present invention provides a fermentation time that is equal to or less than the fermentation times achieved through the use of conventional yeast foods utilized at standard industry concentrations.

EXAMPLE 5

Bread was baked utilizing a yeast food containing urea and potassium bromate and compared with bread baked with no yeast food and a yeast food consisting of ammonium sulfate in the standard concentration. The following yeast foods and concentrations were utilized:

| Trial No. | Yeast Food Type | Yeast Food Dosage** |
|---|---|---|
| 1. | No yeast food | — |
| 2. | Ammonium Sulfate | * |
| 3. | Urea and Potassium Bromate | 22 ppm/cwt. |
| 4. | Urea and Potassium Bromate | 44 ppm/cwt. |
| 5. | Urea and Potassium Bromate | 66 ppm/cwt. |
| 6. | Urea and Potassium Bromate | 88 ppm/cwt. |
| 7. | Urea and Potassium Bromate | 110 ppm/cwt. |
| 8. | Urea and Potassium Bromate | 132 ppm/cwt. |

*Indicates dosage was normal industry dosage for this type of yeast food, as set forth in Example 1.
**ppm are given for the concentration of urea only, with potassium bromate being present in a concentration equal to 17/50ths of the urea concentration.

After baking, the resulting products were evaluated on the basis of eleven bread and dough characteristics. Each of the characteristics was assigned a number range, with the highest number of that particular range indicating a perfect score. After evaluating each of the eleven characteristics for a particular trial, the total score for each trial was determined by adding the points assigned for each particular characteristic, thus providing an overall rating for each of the trials. The following characteristics and number ratings were utilized:

| Characteristics | Rating Worst–Best |
|---|---|
| Dough Quality | 0–10 |
| Dough Extensibility | 0–10 |
| Dough Condition-Molding | 0–5 |
| Dough Condition-Rounding | 0–5 |
| Bread Grain | 0–10 |
| Bread Texture | 0–10 |
| Bread Softness | 0–10 |
| Bread Volume | 0–10 |
| Bread Symmetry | 0–10 |
| Bread Crumb color | 0–5 |
| Bread Taste | 0–15 |

After evaluating the doughs and the breads which resulted from the yeast foods and dosages as set forth above with each particular bread receiving the following scores based on the aforementioned characteristics:

| CHARACTERISTIC | TRIAL NUMBER | | | | | | | |
|---|---|---|---|---|---|---|---|---|
| | 1 | 2 | 3 | 4 | 5 | 6 | 7 | 8 |
| Dough Quality | 8 | 9 | 8 | 9 | 9 | 8 | 8 | 8 |
| Dough Extensibility | 9 | 9 | 8 | 8 | 9 | 9 | 8 | 8 |
| Dough Condition-Moulding | 4 | 4 | 4 | 4 | 4 | 4 | 3 | 3 |
| Dough Condition-Rounding | 3 | 3 | 3 | 4 | 4 | 4 | 4 | 4 |
| Bread Grain | 9 | 9 | 9 | 9 | 9 | 8 | 9 | 8 |
| Bread Texture | 9 | 9 | 9 | 9 | 9 | 9 | 9 | 7 |
| Bread Softness | 9 | 9 | 9 | 9 | 9 | 9 | 8 | 9 |
| Bread Volume | 8 | 9 | 8 | 8 | 9 | 9 | 9 | 9 |
| Bread Symmetry | 7 | 8 | 8 | 9 | 8 | 9 | 8 | 8 |
| Bread Crumb Color | 5 | 4 | 4 | 4 | 5 | 5 | 5 | 3 |
| Bread Taste | 12 | 13 | 14 | 14 | 14 | 15 | 15 | 14 |
| Total Score | 83 | 87 | 84 | 87 | 89 | 89 | 86 | 81 |

Thus, these results indicate that bread baked utilizing the yeast food in accordance with the present invention at various concentrations resulted in bread having characteristics that were generally as good as or better than bread baked with no yeast food or with the standard concentration of ammonium sulfate.

While this invention has been described in relation to its preferred embodiments, it is to be understood that various modifications thereof will now be apparent to one skilled in the art upon reading this specification and it is intended to cover such modifications which fall within the scope of the appended claims.

We claim:

1. In a method of baking yeast leavened bakery products wherein dough is admixed with yeast, the dough is allowed to ferment, followed by the baking of the dough, the improvement comprising the addition of an amount of urea of from about 5 to about 400 weight parts per million weight parts of flour utilized to form the dough.

2. The method as recited in claim 1 wherein said urea is included in a yeast food.

3. The method as recited in claim 1 wherein said urea is added directly to the flour.

4. A yeast food flour additive consisting essentially of a nitrogen source for the yeast said additive providing from about 5 to about 400 weight parts urea per million parts of flour and an effective amount of an oxidizer.

5. The yeast food as recited in claim 4 wherein said oxidizer is selected from the group consisting of potassium bromate, calcium bromate, potassium iodate, calcium iodate, azodicarbonamide, ascorbic acid and calcium dioxide.

6. The yeast food as recited in claim 4 wherein the yeast food is contained within a water soluble starch film pouch.

7. A method for reducing the proofing time required for yeast leavened bakery products which comprises adding to dough utilized to prepared said products, the yeast food additive defined by claim 4; said additive being added prior to fermentation of the dough and an amount sufficient to reduce the proofing time.

* * * * *